(12) United States Patent
Kimura

(10) Patent No.: US 12,181,691 B2
(45) Date of Patent: Dec. 31, 2024

(54) INSPECTING APPARATUS

(71) Applicant: DISCO CORPORATION, Tokyo (JP)

(72) Inventor: Nobuyuki Kimura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 213 days.

(21) Appl. No.: 17/813,443

(22) Filed: Jul. 19, 2022

(65) Prior Publication Data

US 2023/0045148 A1 Feb. 9, 2023

(30) Foreign Application Priority Data

Aug. 5, 2021 (JP) ................................. 2021-128754

(51) Int. Cl.
| | |
|---|---|
| G02B 5/00 | (2006.01) |
| G01N 21/95 | (2006.01) |
| G02B 17/00 | (2006.01) |
| G02B 5/10 | (2006.01) |

(52) U.S. Cl.
CPC ......... *G02B 5/005* (2013.01); *G01N 21/9501* (2013.01); *G02B 17/00* (2013.01); *G01N 2201/0635* (2013.01); *G01N 2201/0636* (2013.01); *G02B 5/10* (2013.01)

(58) Field of Classification Search
CPC .......... G02B 5/005; G02B 17/00; G02B 5/10; G01N 21/9501; G01N 2201/0635; G01N 2201/0636
See application file for complete search history.

(56) References Cited

U.S. PATENT DOCUMENTS

| | | | |
|---|---|---|---|
| 6,404,498 B1 * | 6/2002 | Maeda ................ | G01N 21/956 356/394 |
| 7,248,352 B2 * | 7/2007 | Hamamatsu ....... | G01N 21/8806 356/237.4 |
| 2005/0190259 A1 * | 9/2005 | Mitsuhashi ............. | H04N 9/47 348/87 |
| 2020/0134773 A1 * | 4/2020 | Pinter ................ | G01N 21/8806 |

FOREIGN PATENT DOCUMENTS

| | | |
|---|---|---|
| DE | 112018007301 T5 | 2/2021 |
| JP | 2002192370 A | 7/2002 |
| JP | 2005184032 A | 7/2005 |
| JP | 2012008078 A | 1/2012 |
| JP | 2017220480 A | 12/2017 |
| WO | 2008052526 A1 | 5/2008 |

OTHER PUBLICATIONS

Office Action issued in counterpart German patent application No. 10 2022 207 871.3, dated Mar. 21, 2023.

* cited by examiner

*Primary Examiner* — Hung V Nguyen
(74) *Attorney, Agent, or Firm* — Greer Burns & Crain Ltd.

(57) ABSTRACT

An inspecting apparatus includes a table for supporting a workpiece thereon, a light applying unit for applying light to the workpiece supported on the table, and a light detector for detecting light reflected from the workpiece. The light detector includes a camera and a diffusion plate disposed between the table and the camera.

11 Claims, 3 Drawing Sheets

INSPECTING APPARATUS

BACKGROUND OF THE INVENTION

Field of the Invention

The present invention relates to an inspecting apparatus for inspecting a workpiece.

Description of the Related Art

Wafers with devices such as integrated circuits (ICs) and large-scale-integration (LSI) circuits formed in respective areas demarcated on their face side by a plurality of projected dicing lines are divided into individual device chips including the respective devices, and the device chips will be used in electronic appliances such as mobile phones and personal computers. More specifically, a laser beam having a wavelength transmittable through such a wafer is applied to the wafer from a reverse side thereof along the projected dicing lines while a focused spot of the laser beam is being positioned in the wafer, thereby forming modified layers in the wafer along the projected dicing lines. Then, the reverse side of the wafer is ground to thin down the wafer. Thereafter, external forces are applied to the wafer to divide the wafer into individual device chips along the modified layers (see, for example, Japanese Patent No. 3408805 and Japanese Patent No. 4358762).

If the modified layers are not properly formed in the wafer along the projected dicing lines, the wafer cannot be divided into individual device chips and may be damaged. In view of these problems, the applicant of the present invention has proposed a method of detecting modified layers formed in a wafer by applying light to a reverse side of the wafer and projecting an image of reflected light, according to the principle of what is generally called a magic mirror, on the basis of the fact that the reverse side of the wafer develops surface irregularities due to the modified layers in the wafer, and an inspecting apparatus suitable for carrying out the method (see Japanese Patent Laid-open No. 2017-220480).

SUMMARY OF THE INVENTION

However, the method of detecting modified layers formed in a wafer as disclosed in Japanese Patent Laid-open No. 2017-220480 is likely to entail an increased cost because the larger the diameter of wafers to be handled, the larger the diameter of a condensing lens for converging light reflected from the wafers onto a focusing lens. Furthermore, since the contrast of the modified layers in the projected image is not clear, as the devices formed in wafers are smaller in size, it is more difficult to determine whether or not properly formed modified layers are present in the wafers because the modified layers formed in the wafers along the projected dicing lines also become smaller.

It is therefore an object of the present invention to provide an inspecting apparatus that is capable of detecting whether or not properly formed modified layers are present in a wafer with an inexpensive apparatus make-up that is configured to avoid increasing the diameter of a condensing lens.

In accordance with an aspect of the present invention, there is provided an inspecting apparatus for inspecting a workpiece, including a table for supporting the workpiece thereon, a light applying unit for applying light to the workpiece supported on the table, and a light detector for detecting light reflected from the workpiece. The light detector includes a camera and a diffusion plate disposed between the table and the camera.

Preferably, the light applying unit includes a white light source, a diffraction grating for diffracting white light emitted by the white light source, and light selecting means for selecting a light of a particular wavelength from a plurality of lights of different wavelengths from the diffraction grating, so that the light applying unit is capable of applying the selected light of the particular wavelength to the workpiece. Alternatively, the light selecting means includes a pinhole mask for selecting the light of the particular wavelength from the plurality of lights of different wavelengths from the diffraction grating.

Preferably, the light selecting means includes a first converging mirror for reflecting the plurality of lights of different wavelengths from the diffraction grating, a second converging mirror having a focal length same as that of the first converging mirror, the first converging mirror and the second converging mirror being disposed in point symmetry with each other with respect to a focal point of the first converging mirror, and an optical path changing mirror for changing optical paths that is positioned at a focal point of the second converging mirror. The pinhole mask selects the light of the particular wavelength from the plurality of lights of different wavelengths whose optical paths have been changed by the optical path changing mirror. Preferably, the light selecting means further includes a third converging mirror disposed between the optical path changing mirror and the pinhole mask in such a manner that the third converging mirror has a focal point positioned at the pinhole mask. Preferably, the white light source is selected from a group consisting of a super luminescent diode (SLD) light source, an amplified spontaneous emission (ASE) light source, a light emitting diode (LED) light source, a supercontinuum light source, a halogen light source, a xenon light source, a mercury light source, and a metal halide light source.

With the inspecting apparatus according to the present invention, the reflected light from the workpiece is appropriately diffused by the diffusion plate and represents surface irregularities formed on the workpiece due to modified layers formed in the workpiece, so that an image captured by the camera represents those surface irregularities on the workpiece. Therefore, the inspecting apparatus is inexpensive as it avoids increasing the diameter of a condensing lens. Since the white light emitted from the white light source is diffracted by the diffraction grating and a light of a particular wavelength is applied to the workpiece, the contrast of the image is made clearer by the light of the wavelength that is suitable for the workpiece, making it possible to detect reliably the modified layers in the workpiece.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
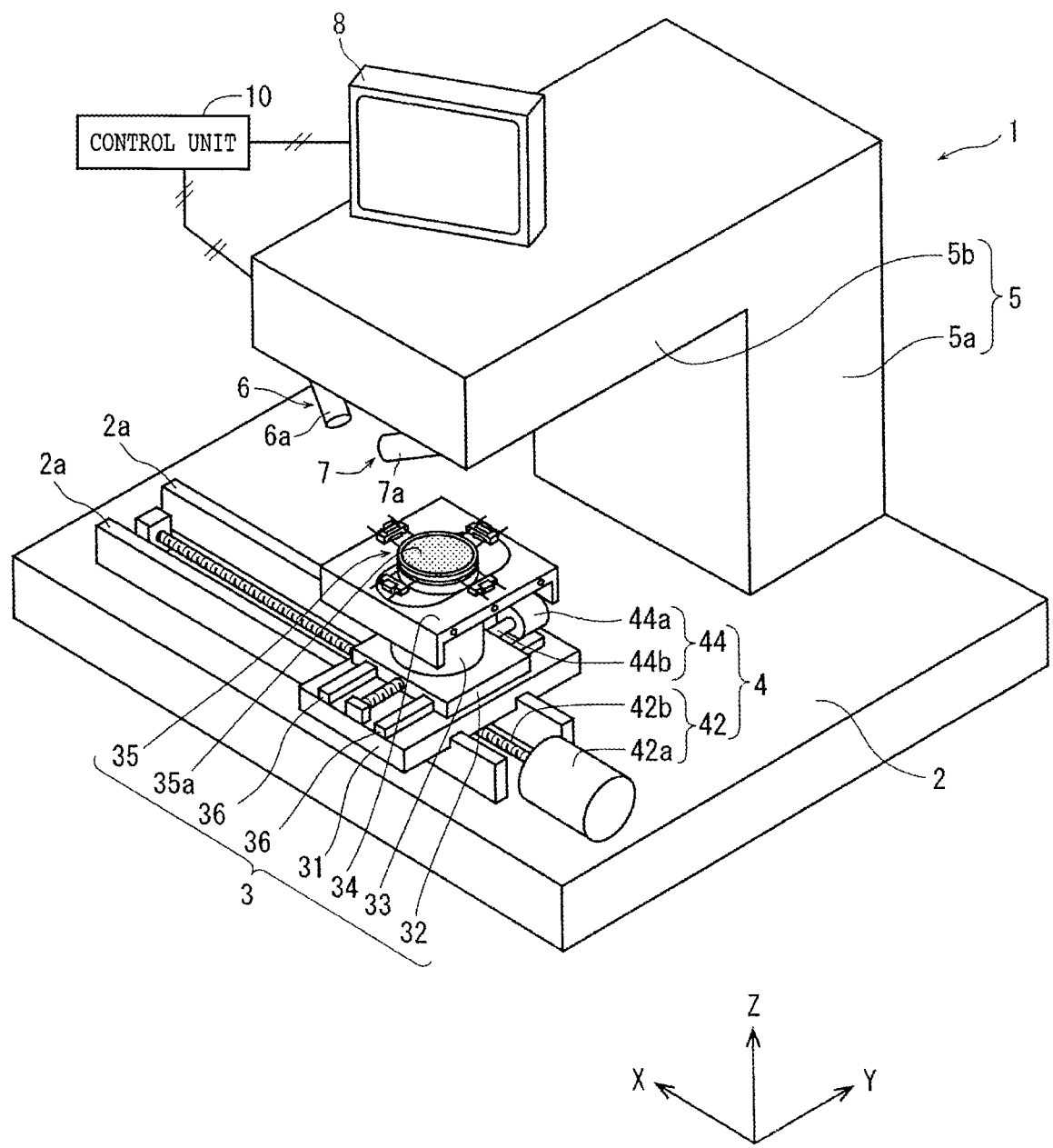
FIG. 1 is a perspective view of an inspecting apparatus according to an embodiment of the present invention.

An inspecting apparatus according to an embodiment of the present invention will be described in detail below with reference to the accompanying drawings. FIG. 1 illustrates in perspective the inspecting apparatus, denoted by 1, according to the present embodiment. As illustrated in FIG. 1, the inspecting apparatus 1 includes at least a table 35 for supporting a workpiece thereon, a light applying unit 6 for applying light to the workpiece supported on the table 35, and a light detector or light detecting unit 7 for detecting light reflected from the workpiece.

The table 35 of the inspecting apparatus 1 is a part of a holding unit 3 of the inspecting apparatus 1. The inspecting apparatus 1 includes a base 2, and the holding unit 3 includes a rectangular X-axis movable plate 31 movably mounted on a pair of guide rails 2a disposed on the base 2 and extending parallel to each other along an X-axis, a rectangular Y-axis movable plate 32 movably mounted on a pair of guide rails 36 disposed on the X-axis movable plate 31 and extending parallel to each other along a Y-axis, a hollow cylindrical support post 33 fixedly mounted on an upper surface of the Y-axis movable plate 32, and a rectangular cover plate 34 fixed to an upper end of the support post 33. The table 35 is a circular member extending upwardly through an oblong hole defined in the cover plate 34 and is rotatable by rotary actuating means, not illustrated. The table 35 has a holding surface 35a made of an air-permeable porous material and lying in a plane defined by the X-axis and the Y-axis. The holding surface 35a is fluidly connected to suction means, not illustrated, through a fluid channel, not illustrated, extending through the support post 33. The X-axis extends along a direction indicated by an arrow X illustrated in FIG. 1, and the Y-axis extends along a direction indicated by an arrow Y illustrated in FIG. 1 and perpendicularly to the X-axis. The plane defined by the X-axis and the Y-axis is essentially a horizontal plane.

Figure 2:
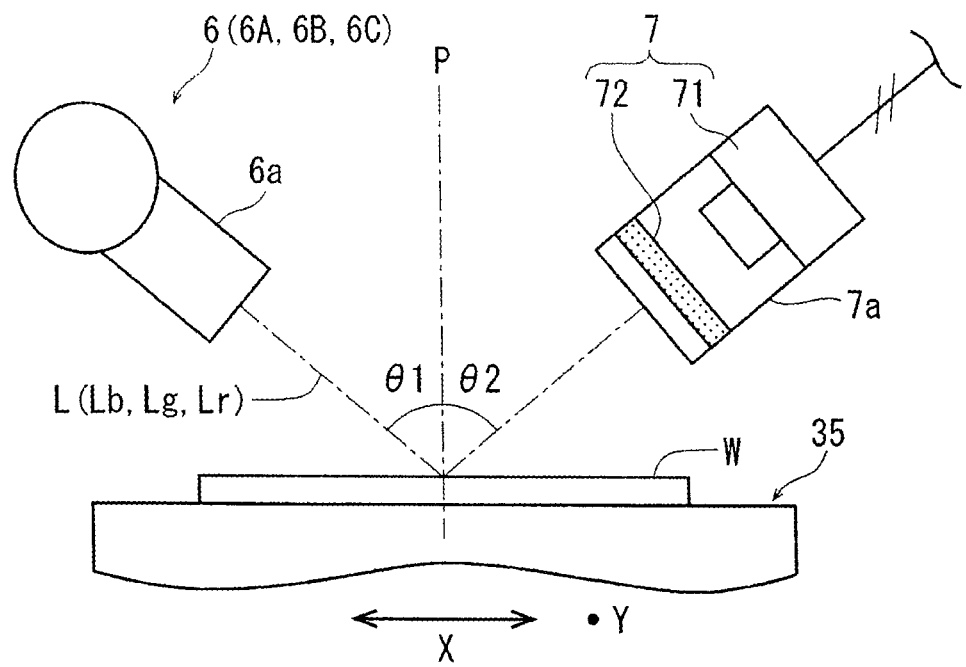
FIG. 2 is a conceptual view illustrating an arrangement of a light applying unit and a light detector of the inspecting apparatus illustrated in FIG. 1.

The inspecting apparatus 1 further includes a frame 5 disposed behind the holding unit 3. The frame 5 includes a vertical wall 5a extending upwardly from an upper surface of the base 2 and a horizontal wall 5b extending substantially horizontally from an upper end of the vertical wall 5a in overhanging relation to the table 35. The horizontal wall 5b houses therein an optical system of the light applying unit 6 and the light detector 7. The light applying unit 6 includes a light emitter 6a mounted on a lower surface of a distal end of the horizontal wall 5b of the frame 5, and the light detector 7 includes a light sensor 7a mounted on the lower surface of the distal end of the horizontal wall 5b. The light emitter 6a and the light sensor 7a are spaced from each other and arrayed along the X-axis. As illustrated in FIG. 2, the light emitter 6a and the light sensor 7a are inclined to the X-axis. In FIG. 2, the light detector 7 is illustrated partly in cross section for illustrative purposes. Light L emitted from the light emitter 6a is applied to the workpiece on the table 35, e.g., a wafer W with modified layers formed therein along projected dicing lines, at an angle θ1 of incidence with respect to a vertical axis P normal to a reverse side, which faces upwardly, of the wafer W. The light sensor 7a is oriented to detect light reflected by the wafer W from the light L at an angle θ2 of reflection (=θ1) with respect to the vertical axis P.

As illustrated in FIG. 2, the light detector 7 includes, as the light sensor 7a, a camera 71 for detecting the reflected light from the wafer W and a diffusion plate 72 disposed between the wafer W on the table 35, i.e., the table 35, and the camera 71. The diffusion plate 72 is made of frosted glass, a frosted sheet, or the like. Frosted glass should preferably be glass with minute surface irregularities formed thereon by sandblasting or the like for diffusing applied light. A frosted sheet should preferably be a resin-made sheet whose surface has been processed in the same manner as with frosted glass.

The table 35 is movable by a moving mechanism 4 (see FIG. 1). The moving mechanism 4 includes an X-axis moving mechanism 42 for moving the table 35 of the holding unit 3 and the light applying unit 6 together with the light detector 7 relatively to each other along the X-axis, and a Y-axis moving mechanism 44 for moving the table 35 of the holding unit 3 and the light applying unit 6 together with the light detector 7 relatively to each other along the Y-axis.

The X-axis moving mechanism 42 has an electric motor 42a disposed on the base 2 and a ball screw 42b having an end coupled to the electric motor 42a and extending along the X-axis. The ball screw 42b is operatively threaded through a nut, not illustrated, fixed to a lower surface of the X-axis movable plate 31. The ball screw 42b and the nut convert rotary motion of the electric motor 42a into linear motion, which is transmitted to the X-axis movable plate 31, moving the X-axis movable plate 31 along the X-axis on the guide rails 2a on the base 2.

The Y-axis moving mechanism 44 has a ball screw 44b rotatably disposed on the X-axis movable plate 31 and extending along the Y-axis and an electric motor 44a coupled to an end of the ball screw 44b. The ball screw 44b is operatively threaded through a nut, not illustrated, fixed to a lower surface of the Y-axis movable plate 32. The ball screw 44b and the nut convert rotary motion of the electric motor 44a into linear motion, which is transmitted to the Y-axis movable plate 32, moving the Y-axis movable plate 32 along the Y-axis on the guide rails 36 on the X-axis movable plate 31.

The movable components including the X-axis moving mechanism 42, the Y-axis moving mechanism 44, etc. and the camera 71 of the inspecting apparatus 1 are electrically connected to a control unit 10 of the inspecting apparatus 1. Display means 8 is also electrically connected to the control unit 10. Images captured by the camera 71 are transmitted via the control unit 10 to the display means 8.

The light applying unit 6 that is suitable for the present invention may be of any of various configurations. Such various light applying units will be described below. First, a light applying unit 6A according to a first embodiment will be described below with reference to FIG. 3.

Figure 3:
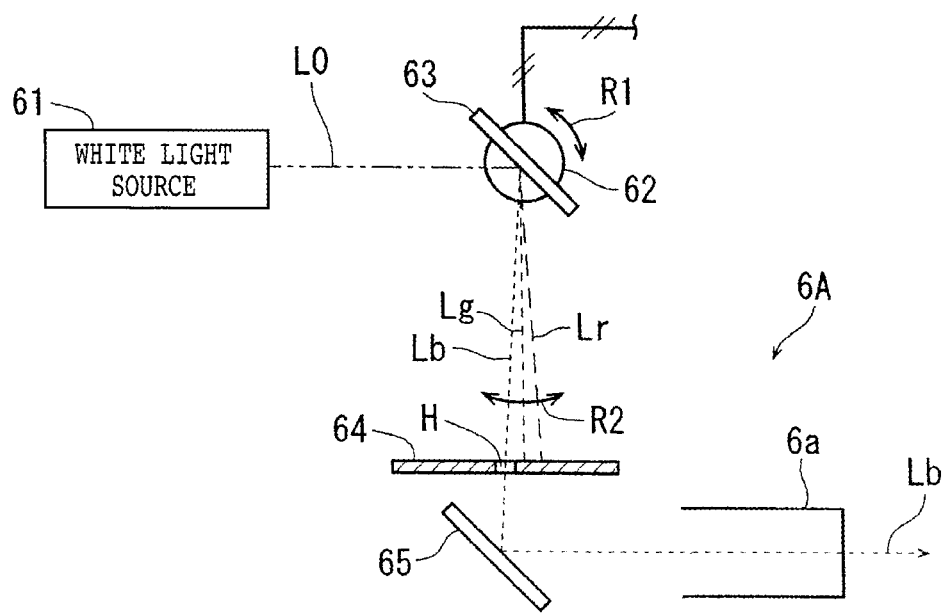
FIG. 3 is a schematic view, partly in block form, illustrating an optical system according to a first embodiment of the light applying unit of the inspecting apparatus illustrated in FIG. 1.

As illustrated in FIG. 3, the light applying unit 6A includes a white light source 61, a stepping motor 62, a diffraction grating 63 actuatable by the stepping motor 62, a pinhole mask 64 having a pinhole H, and a reflecting mirror 65 for reflecting light that has passed through the pinhole H of the pinhole mask 64 to travel through a different optical path. The light that has been reflected by the reflecting mirror 65 is emitted from the light emitter 6a. The white light source 61 is a light source for emitting white light L0 made up of lights that have respective wavelengths in the range from 400 to 800 nm, for example, referred to as visible lights, and that are substantially uniformly mixed together. For example, the white light source 61 should preferably be any one of various light sources including an SLD light source, an ASE light source, an LED light source, a supercontinuum light source, a halogen light source, a xenon light source, a mercury light source, and a metal halide light source. The white light L0 emitted from the white light source 61 is converted into parallel-ray light and applied to the diffraction grating 63.

The diffraction grating 63 diffracts the emitted white light L0 to break it into lights of different wavelengths that travel at different angles from the diffraction grating 63. More specifically, as illustrated in FIG. 3, the white light L0 emitted from the white light source 61 is diffracted by the diffraction grating 63 into a blue light Lb having a short wavelength, a green light Lg having a longer wavelength than the blue light Lb, and a red light Lr having a longer wavelength than the green light Lg. In FIG. 3, the white light L0 is illustrated as being diffracted into the blue light Lb, the green light Lg, and the red light Lr for the sake of brevity. Actually, however, the white light L0 is made up of uniformly mixed lights of all wavelengths included in visible light and is diffracted into a plurality of lights including a violet light, a pale blue light, a yellow light, an orange light, etc.

The stepping motor 62 functions as turning means for turning the diffraction grating 63 about its central axis. When the stepping motor 62 is energized, it adjusts or continuously changes the angle of the diffraction grating 63 in directions indicated by an arrow R1 in FIG. 3, moving optical paths of the blue light Lb, the green light Lg, and the red light Lr reflected and diffracted by the diffraction grating 63 in directions indicated by an arrow R2. The blue light Lb, the green light Lg, and the red light Lr from the diffraction grating 63 are applied to the pinhole mask 64 and sweep over the pinhole mask 64 as their optical paths are moved in the directions indicated by the arrow R2. Therefore, only a light of a particular wavelength, e.g., the blue light Lb in FIG. 3, selectively passes through the pinhole H of the pinhole mask 64 at a time. According to the first embodiment illustrated in FIG. 3, therefore, the stepping motor 62 and the pinhole mask 64 jointly function as light selecting means for selecting at a time a light of a particular wavelength from the multiple lights of different wavelengths, i.e., the blue light Lb, the green light Lg, the red light Lr, etc. diffracted by the diffraction grating 63. In FIG. 3, the blue light Lb is illustrated as selectively passing through the pinhole H of the pinhole mask 64 and emitted from the light emitter 6a. Actually, however, the stepping motor 62 is energized by a command signal from the control unit 10 to turn the diffraction grating 63, enabling the light emitter 6a to select and emit one of lights of various different wavelengths at a time.

Operation and advantages of the light applying unit 6A according to the first embodiment that is used as the light applying unit 6 of the inspecting apparatus 1 illustrated in FIG. 1 will be described below. The wafer W is held as a workpiece under suction on the table 35 with its reverse side facing upwardly, and the moving mechanism 4 is operated to move the wafer W to a position directly below the light applying unit 6A and the light detector 7. Then, the light applying unit 6A is energized to cause the white light source 61 to emit the white light L0. The white light L0 is diffracted by the diffraction grating 63, and one of the lights of different wavelengths reflected by the diffraction grating 63 is selected by the stepping motor 62 and the pinhole mask 64 that function as the light selecting means and is applied to the reverse side of the wafer W. The light applied from the light applying unit 6A to the reverse side of the wafer W is reflected therefrom, and the camera 71 of the light detector 7 captures an image of the reflected light from the wafer W.

The diffusion plate 72 of the light detector 7 is disposed between the wafer W, i.e., the table 35, and the camera 71, as described above. The light reflected by the reverse side of the wafer W is appropriately diffused by the diffusion plate 72 and represents surface irregularities formed on the reverse side of the wafer W due to the modified layers formed in the wafer W, so that the image captured by the camera 71 represents those surface irregularities on the reverse side of the wafer W. Furthermore, when the stepping motor 62 is energized, the wavelength of the light selected by the pinhole mask 64 is changed to adjust the wavelength of the light emitted from the light emitter 6a of the light applying unit 6A. It is thus possible to select the light of the wavelength that is suitable for the state of the wafer W, e.g., the material of the wafer W, the shape of the surface irregularities formed on the reverse side of the wafer W due to the modified layers in the wafer W, and the dimensions of those surface irregularities, so that the contrast of the image captured by the camera 71 can be made clearer for inspecting more reliably whether or not the modified layers are properly formed in the wafer W.

The light applying unit 6 is not limited to the light applying unit 6A according to the first embodiment. A light applying unit 6B according to a second embodiment that can be used as the light applying unit 6 will be described below with reference to FIG. 4.

Figure 4:
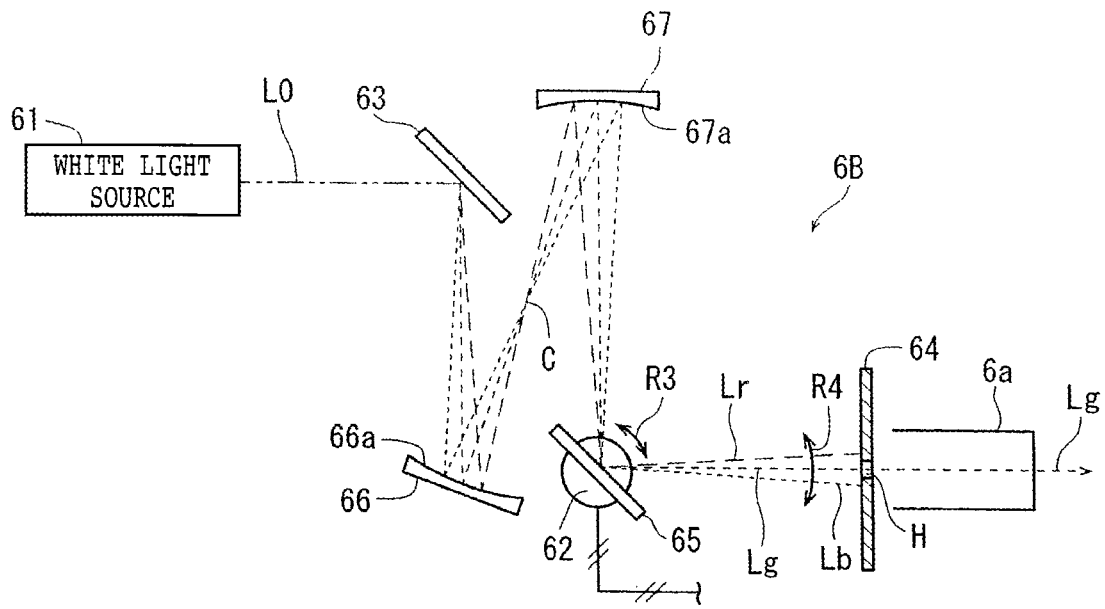
FIG. 4 is a schematic view, partly in block form, illustrating an optical system according to a second embodiment of the light applying unit of the inspecting apparatus illustrated in FIG. 1.

As illustrated in FIG. 4, the light applying unit 6B includes, in addition to a white light source 61, a diffraction grating 63, and a pinhole mask 64 for selecting one of the lights of the different wavelengths, i.e., the blue light Lb, the green light Lg, the red light Lr, etc. with a pinhole H, which are the same as those of the light applying unit 6A illustrated in FIG. 3, a first converging mirror 66 for reflecting the lights of the wavelengths diffracted by the diffraction grating 63, a second converging mirror 67 having a focal length same as that of the first converging mirror 66, the first converging mirror 66 and the second converging mirror 67 being disposed in point symmetry with each other with respect to a focal point C of the first converging mirror 66, an optical path changing mirror 65 for changing optical paths that is positioned at the focal point of the second converging mirror 67, and a stepping motor 62 for adjusting the angle of reflection of the optical path changing mirror 65. The diffraction grating 63 of the light applying unit 6B is fixed and cannot be turned. The light applying unit 6B according to the second embodiment operates as follows. The lights of the different wavelengths, i.e., the blue light Lb, the green light Lg, the red light Lr, etc., diffracted by the diffraction grating 63 are converged by a converging surface 66a of the first converging mirror 66, led to the second converging mirror 67, converged by a converging surface 67a of the second converging mirror 67, and led to the pinhole mask 64. Light selecting means according to the second embodiment includes the first converging mirror 66, the second converging mirror 67, the optical path changing mirror 65, the stepping motor 62, and the pinhole mask 64.

The light applying unit 6B according to the second embodiment illustrated in FIG. 4 is used as the light applying unit 6 of the inspecting apparatus 1, and the stepping motor 62 is energized to adjust the angle of the optical path changing mirror 65 in directions indicated by an arrow R3, thereby adjusting the angles of the lights reflected by the optical path changing mirror 65 in directions indicated by an arrow R4. As with the first embodiment descried above, one of the wavelengths of the lights selected by the pinhole mask 64 is changed to adjust the wavelength of the light emitted from the light emitter 6a of the light applying unit 6B. Therefore, it is possible to select the light of the wavelength that is suitable for the state of the wafer W, e.g., the material of the wafer W, the shape of the surface irregularities formed on the reverse side of the wafer W due to the modified layers in the wafer W, and the dimensions of those surface irregularities, so that the contrast of the image captured by the camera 71 can be made clearer, with use of the diffusion plate 72, for inspecting more reliably whether or not the modified layers are properly formed in the wafer W.

The light applying unit 6 is not limited to the light applying units 6A and 6B according to the first and second embodiments. A light applying unit 6C according to a third embodiment that can be used as the light applying unit 6 will be described below with reference to FIG. 5.

Figure 5:
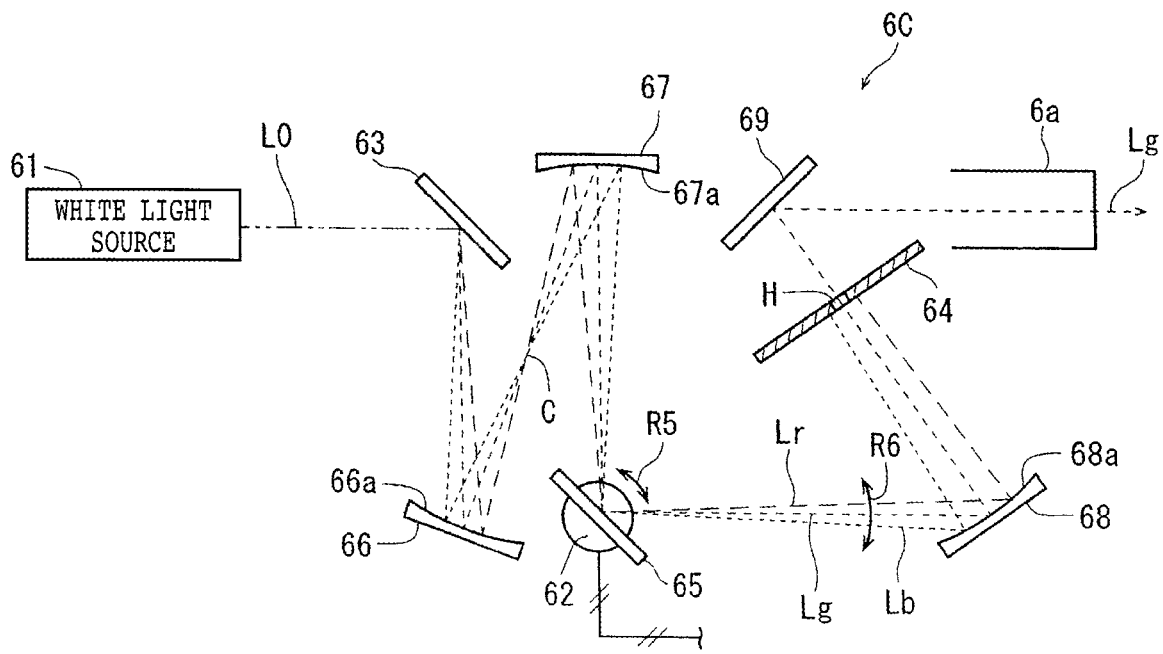
FIG. 5 is a schematic view, partly in block form, illustrating an optical system according to a third embodiment of the light applying unit of the inspecting apparatus illustrated in FIG. 1.

As illustrated in FIG. 5, the light applying unit 6C includes, in addition to the components of the light applying unit 6B illustrated in FIG. 4, a third converging mirror 68 disposed between the optical path changing mirror 65 and the pinhole mask 64 in such a manner that the focus of light converged by a converging surface 68a of the third converging mirror 68 is positioned at the pinhole H of the pinhole mask 64. The light applying unit 6C also includes a reflecting mirror 69 for reflecting light that has passed through the pinhole H. The reflecting mirror 69 is not an indispensable component, and the light that has passed through the pinhole H may be emitted directly from the light emitter 6a.

The light applying unit 6C according to the third embodiment operates as follows. The stepping motor 62 for adjusting the angle of reflection of the optical path changing mirror 65 is energized by a command signal from the control unit 10 to adjust the angle of the optical path changing mirror 65 in directions indicated by an arrow R5, thereby adjusting the angles of the lights reflected by the optical path changing mirror 65 in directions indicated by an arrow R6. Light selecting means according to the third embodiment includes the first converging mirror 66, the second converging mirror 67, the optical path changing mirror 65, the stepping motor 62, the pinhole mask 64, and the third converging mirror 68.

Since the third converging mirror 68 converges the lights to be led to the pinhole H of the pinhole mask 64, i.e., the blue light Lb, the green light Lg, the red light Lr, etc., the light applying unit 6C is able to limit and select the wavelengths of the lights to pass through the pinhole H, compared with the light applying units 6A and 6B according to the first and second embodiments, so that the contrast of the image captured by the camera 71 can be made much clearer for inspecting much more reliably whether or not the modified layers are properly formed in the wafer W.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An inspecting apparatus for inspecting a workpiece, comprising:
    a table for supporting the workpiece thereon;
    a light applying unit for applying light to the workpiece supported on the table, wherein the light applying unit includes:
        a white light source,
        a diffraction grating for diffracting white light emitted by the white light source, and
        light selecting means for selecting a light of a particular wavelength from a plurality of lights of different wavelengths from the diffraction grating, wherein the light selecting means includes a stepping motor, wherein the stepping motor turns the diffraction grating about a central axis of the diffraction grating such that the diffraction grating is actuatable by the stepping motor; and
    a light detector for detecting light reflected from the workpiece,
    wherein the light detector includes a camera and a diffusion plate disposed between the table and the camera.

2. The inspecting apparatus according to claim 1, wherein
    the light applying unit is capable of applying the selected light of the particular wavelength to the workpiece.

3. The inspecting apparatus according to claim 1, wherein the light selecting means includes a pinhole mask for selecting the light of the particular wavelength from the plurality of lights of different wavelengths from the diffraction grating.

4. The inspecting apparatus according to claim 3, wherein the light selecting means includes:
    a first converging mirror for reflecting the plurality of lights of different wavelengths from the diffraction grating,
    a second converging mirror having a focal length which is the same as a focal length of the first converging mirror, the first converging mirror and the second converging mirror being disposed in point symmetry with each other with respect to a focal point of the first converging mirror, and
    an optical path changing mirror for changing optical paths that is positioned at a focal point of the second converging mirror, and
    the pinhole mask selects the light of the particular wavelength from the plurality of lights of different wavelengths whose optical paths have been changed by the optical path changing mirror.

5. The inspecting apparatus according to claim 4, wherein the light selecting means further includes a third converging mirror disposed between the optical path changing mirror and the pinhole mask in such a manner that the third converging mirror has a focal point positioned at the pinhole mask.

6. The inspecting apparatus according to claim 2, wherein the white light source is selected from a group consisting of a super luminescent diode light source, an amplified spontaneous emission light source, a light emitting diode light source, a supercontinuum light source, a halogen light source, a xenon light source, a mercury light source, and a metal halide light source.

7. An inspecting apparatus for inspecting a workpiece, comprising:
    a table for supporting the workpiece thereon;
    a light applying unit for applying light to the workpiece supported on the table, wherein the light applying unit includes:
        a white light source,
        a diffraction grating for diffracting white light emitted by the white light source, and light selecting means for selecting a light of a particular wavelength from a plurality of lights of different wavelengths from the diffraction grating, so that the light applying unit is capable of applying the selected light of the particular wavelength to the workpiece, wherein the light selecting means includes:
- a first converging mirror for reflecting the plurality of lights of different wavelengths from the diffraction grating,
- a second converging mirror having a focal length which is the same as a focal length of the first converging mirror, the first converging mirror and the second converging mirror being disposed in point symmetry with each other with respect to a focal point of the first converging mirror, and
- an optical path changing mirror for changing optical paths that is positioned at a focal point of the second converging mirror, and
- the pinhole mask selects the light of the particular wavelength from the plurality of lights of different wavelengths whose optical paths have been changed by the optical path changing mirror; and a light detector for detecting light reflected from the workpiece wherein the light selecting means includes a pinhole mask for selecting the light of the particular wavelength from the plurality of lights of different wavelengths from the diffraction grating, wherein the light detector includes a camera and a diffusion plate disposed between the table and the camera.

8. The inspecting apparatus according to claim 7, wherein the light selecting means further includes a third converging mirror disposed between the optical path changing mirror and the pinhole mask in such a manner that the third converging mirror has a focal point positioned at the pinhole mask.

9. An inspecting apparatus for inspecting a workpiece, comprising:
- a table for supporting the workpiece thereon;
- a light applying unit for applying light to the workpiece supported on the table, wherein the light applying unit includes:
  - a white light source,
  - an optical path changing mirror,
  - a diffraction grating for diffracting white light emitted by the white light source,
  - a pinhole mask for selecting the light of the particular wavelength from the plurality of lights of different wavelengths from the diffraction grating, and
  - a converging mirror disposed between the optical path changing mirror and the pinhole mask in such a manner that the converging mirror has a focal point positioned at the pinhole mask, and
- a light detector for detecting light reflected from the workpiece,
- wherein the light detector includes a camera and a diffusion plate disposed between the table and the camera.

10. The inspecting apparatus according to claim 9, wherein the light applying unit further comprises a stepping motor, wherein the optical path changing mirror is actuatable by the stepping motor, such the stepping motor turns the optical path changing mirror about a central axis of the optical path changing mirror.

11. The inspecting apparatus according to claim 9, wherein the white light source is selected from a group consisting of a super luminescent diode light source, an amplified spontaneous emission light source, a light emitting diode light source, a supercontinuum light source, a halogen light source, a xenon light source, a mercury light source, and a metal halide light source.

\* \* \* \* \*